(12) United States Patent
Miyazaki

(10) Patent No.: US 6,538,418 B2
(45) Date of Patent: Mar. 25, 2003

(54) DRIVING SIGNAL SUPPLY CIRCUIT

(75) Inventor: Takahiro Miyazaki, Hiji-machi (JP)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/173,430

(22) Filed: Jun. 17, 2002

(65) Prior Publication Data

US 2002/0190701 A1 Dec. 19, 2002

(51) Int. Cl.[7] .............................. G05F 1/44; G05F 1/56; G05F 1/40
(52) U.S. Cl. .................. 323/284; 323/285; 323/290; 323/222
(58) Field of Search ................................ 323/222, 282, 323/284, 285, 286, 290

(56) References Cited

U.S. PATENT DOCUMENTS

| | | | | |
|---|---|---|---|---|
| 5,481,178 A | * | 1/1996 | Wilcox et al. | 323/287 |
| 5,731,694 A | * | 3/1998 | Wilcox et al. | 323/287 |
| 5,745,972 A | * | 5/1998 | Yokayama et al. | 29/430 |
| 5,939,871 A | * | 8/1999 | Tanaka | 323/285 |
| 5,994,885 A | * | 11/1999 | Wilcox et al. | 323/285 |
| 6,404,175 B1 | * | 6/2002 | Yang et al. | 323/282 |

* cited by examiner

Primary Examiner—Bao Q. Vu
(74) Attorney, Agent, or Firm—W. Daniel Swayze, Jr.; W. James Brady; Frederick J. Telecky, Jr.

(57) ABSTRACT

A switching power supply circuit display an oscillation frequency will not be lowered with a light load. After the first output transistor 11 turns from conduction to cut-off, when the second output transistor 12 conducts, first, by means of the energy accumulated in the inductance element 13, a current will flow from the source terminal toward the drain terminal of the second output transistor 12, and then by means of the discharge of the output capacitor 14, a current will flow from the drain terminal toward the source terminal. Next, in case of a light load, the second output transistor 12, before being cut off by the control circuit 20, is cut off by the frequency control unit 50. By means of the discharge of the output capacitor 14, the lowering of oscillation frequency in case of a light load is prevented. In case of a heavy load, the control circuit 50 detects the voltage lowering of the output terminal 18, cuts off the second output transistor 12, makes the first output transistor 11 conductive, and thereby maintains a constant output voltage.

3 Claims, 4 Drawing Sheets

DRIVING SIGNAL SUPPLY CIRCUIT

FIELD OF THE INVENTION

The present invention pertains to the switching power supply technical field. In particular, it pertains to a power supply suitable for portable computers.

BACKGROUND OF THE INVENTION

Element 510 in FIG. 6 indicates an example of a switching regulator in the prior art.

This switching power supply 510 comprises a control circuit 520, an output transistor 511, an inductance element 513, an output capacitor 514 and a flywheel diode 517.

The output transistor 511 is comprised of an n-channel MOSFET, and the gate terminal is connected to the control circuit 520 and its operation is controlled by the control circuit 520.

The drain terminal of the output transistor 511 is connected to a high voltage power supply $V_P$, and the source terminal is connected to one end of the inductance element 513. The other end of said inductance element 513 is connected to the output terminal 518. Between the output terminal 518 and the ground potential, the output capacitor 514 is connected, and the load 515 is connected in parallel with this output capacitor 514.

The anode terminal of the flywheel diode 517 is connected to the ground potential, and the cathode terminal is connected to the source terminal of the output transistor 511.

When the output transistor 511 conducts, the source terminal is connected to the high voltage power supply $V_P$. In this state, the flywheel diode 517 obtains inverse bias, and current is supplied from the high voltage power supply $V_P$ to the output capacitor 514 and the load 515 through the inductance element 513.

When the output transistor 511 is cut off from that state, an electromotive force will be generated in the inductance element 513; the source terminal of the output transistor 511 will be swung to a negative potential; the fly-wheel diode 517 will obtain forward bias; and current will be supplied to the load 515 by means of the energy accumulated in the inductance element 513.

The aforementioned operation of the output transistor 511 is controlled by the control circuit 520. To explain the internal configuration of the control circuit 520, in said control circuit 520, the first and the second potential dividing resistors 521 and 522, a converter 525, a reference voltage circuit 526, a level shift circuit 533, a buffer circuit 535 and an auxiliary power supply circuit 539 are provided.

The voltage of the output terminal 518 is divided by the first and the second potential dividing resistors 521 and 522, and is input to the inverse input terminal of the comparator 525. The reference voltage output by the reference voltage circuit 526 is input to the non-inverse input terminal of the comparator 525, and the comparator 525 compares the divided voltage of the output terminal 518 and the reference voltage, and outputs the result of the comparison to the buffer circuit 535 through the level shift circuit 533.

The buffer circuit 535 operates by means of the auxiliary power supply circuit 539, and according to the result of the comparison, when the divided voltage of the output terminal 518 is smaller than the reference voltage, impresses a high voltage to the gate terminal of the output transistor 511 by means of the power supplied from the auxiliary power supply circuit 539, and makes the output transistor 511 conduct. When the situation is the opposite, it impresses a voltage of the same potential as the source terminal to the gate terminal, and cuts off the output transistor 511.

The aforementioned comparator 525 has a hysteresis characteristic, and controls such that when the output transistor 511 once conducts, the output transistor 511 will not be cut-off unless the divided voltage of the output terminal 518 decreases by the voltage of the hysteresis characteristic.

Because of the hysteresis characteristic, the load 515 is lighter, and when the output current is lowered, it is less likely that the voltage of the output terminal 518 will be lowered, thus, the oscillation frequency of the switching power supply 510 is lowered.

In general, when the switching power supply 510 is used for audio purposes of a computer, if the oscillation frequency of the switching power supply 510 exists in the voice band, there is a problem that the switching frequency will appear as noise in the speaker.

Therefore, with the aforementioned switching power supply 510, the oscillation frequency will be lowered in case of a light load, and when the frequency reaches an upper limit frequency $F_M$ $F_M \approx 20$ kHz or lower, noise will occur.

Element $L_3$ in the graph of FIG. 5 indicates a curve that illustrates the relationship between the magnitude of the load and the oscillation frequency of switching power supply 510. When the load 515 is lighter than the magnitude B, the oscillation frequency will be lower than the upper limit frequency $F_M$ of the voice band.

As a circuit whose oscillation frequency will be constant irrespective of the magnitude of the load, there is the switching power supply indicated with Element 610 in FIG. 7.

This switching power supply 610 comprises first and second transistors 611 and 612, the control circuit 620, the inductance element 613, and the output capacitor 614.

First and the second output transistors 611 and 612 are comprised of n-channel MOSFETs. The drain terminal of the first output transistor 611 is connected to the high voltage power supply $V_P$, and the source terminal of the second output transistor 612 is connected to the ground potential.

The source terminal of the first output transistor 611 and the drain terminal of the second output transistor 612 are connected to each other. If the part where these are connected to each other is the node indicated with Element 619, one end of the inductance element 613 is connected to said node 619.

The other end of the inductance element 613 is connected to the output terminal 618, and between said output terminal 618 and the ground potential, the output capacitor 614 is connected.

The load 615 is connected in parallel with the output capacitor 614.

To the gate terminals of the first and the second output transistors 611 and 612, the control circuit 610 is connected, and the operation of the first and the second output transistors 611 and 612 is controlled by the control circuit 610.

Omitting the explanation of the parts that are the same as those in the switching power supply 510 explained above, the internal configuration of the control circuit 620 of this switching power supply 610 will be explained.

This control circuit 620 comprises first and second control circuits 630 and 640, which respectively control the operation of first and second output transistors 611 and 612.

The voltage of the output terminal 618 is divided by first and second potential dividing resistors 621 and 622; by means of the comparator 625, the divided voltage and a reference voltage output by the reference voltage supply 626 are compared, and the result of the comparison is output from the comparator 625.

If the divided voltage is higher than the reference voltage, a LOW signal will be output, and in the reverse case, a HIGH signal is output.

In first and second control circuits 630 and 640, first and second delay circuits 632 and 642 are respectively provided; and to the first delay circuit 632, the output signal of the comparator 625 is directly input, and to the second delay circuit 642, the output signal of the comparator 625 is input after being reversed by the inverter 641.

The output signal of the first delay circuit 632 is output to the first output transistor 611 through the level shift circuit 633 and the buffer circuit 635; and the output signal of the second delay circuit 642 is output to the second output transistor 612 through the buffer circuit 645.

First and second delay circuits 632 and 642 are configured so as to output after delaying only the timing at which the input signal changes from a LOW signal to a HIGH signal. As a result, with regard to first and second output transistors 611 and 612, of the timings at which the output signal of the comparator 625 switches, only a timing at which one of them turns from a cut-off state to a conductive state will be delayed.

First, in a state where the second output transistor 612 is cut off, when the first output transistor 611 conducts, and one end of the inductance element 613 is connected to the high voltage power supply $V_P$, from the high voltage power supply $V_P$, through the inductance element 613, current is supplied to the load 615 and the output capacitor 614.

Next, when the first output transistor 611 changes from conductive to cut-off, by means of the energy accumulated in the inductance element 613, current is supplied to the load 615 and the output capacitor 614. The current either flows through the parasitic diode in the second output transistor 612, or when the second output transistor 612 is conductive, flows in the opposite direction from normal from the source terminal toward the drain terminal.

In this case, if the second output transistor 612 is conductive, then the output capacitor 614 will start to discharge, and current will flow to the ground potential through the inductance element 613 and the second output transistor 612. Element 616 in FIG. 6 indicates the direction of the discharge current.

Because this discharge current consumes the charge of the output capacitor 614, the voltage of the output terminal 618 will promptly be lowered even in case of a light load.

Then, when the divided voltage of the output terminal 618 becomes lower than the reference voltage, the second output transistor 612 will be cut off without any delay, and then, the first output transistor 611 will become conductive after the delay time set by the first delay circuit 632 has passed.

At the point when the first output transistor 611 has become conductive, due to the discharge of the output capacitor 614, even with the light load, the voltage of the output terminal 618 has been lowered to the same level as in the case of a heavy load.

Therefore, with regard to this switching power supply 620, the oscillation frequencies of first and second output transistors 611 and 612 will be approximately constant irrespective of the magnitude of the load.

Element $L_2$ in the graph of FIG. 5 is a graph that illustrates the relationship between the magnitude of the load 615 and the oscillation frequency of the switching power supply 610.

With regard to this switching power supply 610, the higher the oscillation frequency, the smaller the output ripple voltage, and the easier it is to maintain the voltage of the output terminal 618 constant. Therefore, so as not to lower the voltage of the output terminal 618 with a heavy load, the oscillation frequency is set significantly higher than the upper limit frequency $F_M$ of the voice band. Therefore, on the other hand, with a light load, the oscillation frequency is too high, and the first and the second transistors 611 and 612 switch unnecessarily; thus the efficiency of the light load will be lowered, and therefore, the above is not suitable for a portable computer.

The present invention was created to solve the problems of the aforementioned prior art. The object is to offer a power supply that is suitable for portable computers.

SUMMARY OF THE INVENTION

To solve the aforementioned problem, the driving signal supply circuit of the present invention is a driving signal supply circuit, which supplies driving signals to the first and the second switching transistors of a switching regulator including the first switching transistor connected between a power supply voltage supply terminal and a first node; the second switching transistor connected between the aforementioned first node and a reference voltage supply terminal, which can be in a conductive state when the aforementioned first switching transistor is in a cut-off state; a coil with one end connected to the aforementioned first node; and a smoothing capacitor connected between the other end of the aforementioned coil and the reference voltage supply terminal, and comprises a comparing circuit, which compares a first detected voltage corresponding to the output voltage of the switching regulator with a first reference voltage and outputs a first comparison signal; a first driving circuit, which inputs the aforementioned first comparison signal and outputs a first driving signal to drive the aforementioned first switching transistor; a second driving circuit, which inputs the aforementioned first comparison signal and outputs a second driving signal to drive the aforementioned second switching transistor; a second comparing circuit, which compares a second detected voltage corresponding to the voltage of the aforementioned first node with a second reference voltage and outputs a second comparison signal; and a logic circuit, which inputs the aforementioned second comparison signal and outputs an inhibiting signal to inhibit conduction of the aforementioned second switching transistor.

Further, in the driving signal supply circuit of the present invention, preferably, the aforementioned second reference voltage changes corresponding to the power supply voltage.

Furthermore, in the driving signal supply circuit of the present invention, the aforementioned first driving circuit comprises a first delay circuit that provides a first delay time to the rise or the fall of the aforementioned first comparison signal; and the aforementioned second driving circuit comprises a second delay circuit that provides a second delay time to the rise or the fall of the inverse signal of the aforementioned first comparison signal, and a logic means that does a predetermined logical calculation of the output signal of the aforementioned second delay circuit and the aforementioned inhibiting signal and outputs a logic signal.

The driving signal of the present invention is configured as described above, and a discharge period is provided when the second switching transistor discharges the smoothing capacitor. As the voltage of the smoothing capacitor is lowered corresponding to the amount of electric charge discharged during this discharge period in case of a light load, the output voltage will be lowered. Therefore, the period in which the first switching transistor is cut off will be shorter, and the lowering of the oscillation frequency of the switching regulator in case of a light load will be controlled.

Then, in the driving signal supply circuit of the present invention, the second switching transistor is forced into a cut-off state by the inhibiting signal output corresponding to the voltage of the first node, and the aforementioned discharge period is ended. In this manner, as the aforementioned discharge period is forced to end, and excessive discharge of the smoothing capacitor is prevented, the lowering of the efficiency of the switching regulator is controlled.

In this manner, the switching regulator of the present invention can prevent lowering of the oscillation frequency into the voice band in case of a light load, and can maintain power conversion efficiency.

DESCRIPTION OF EMBODIMENTS

Figure 1:
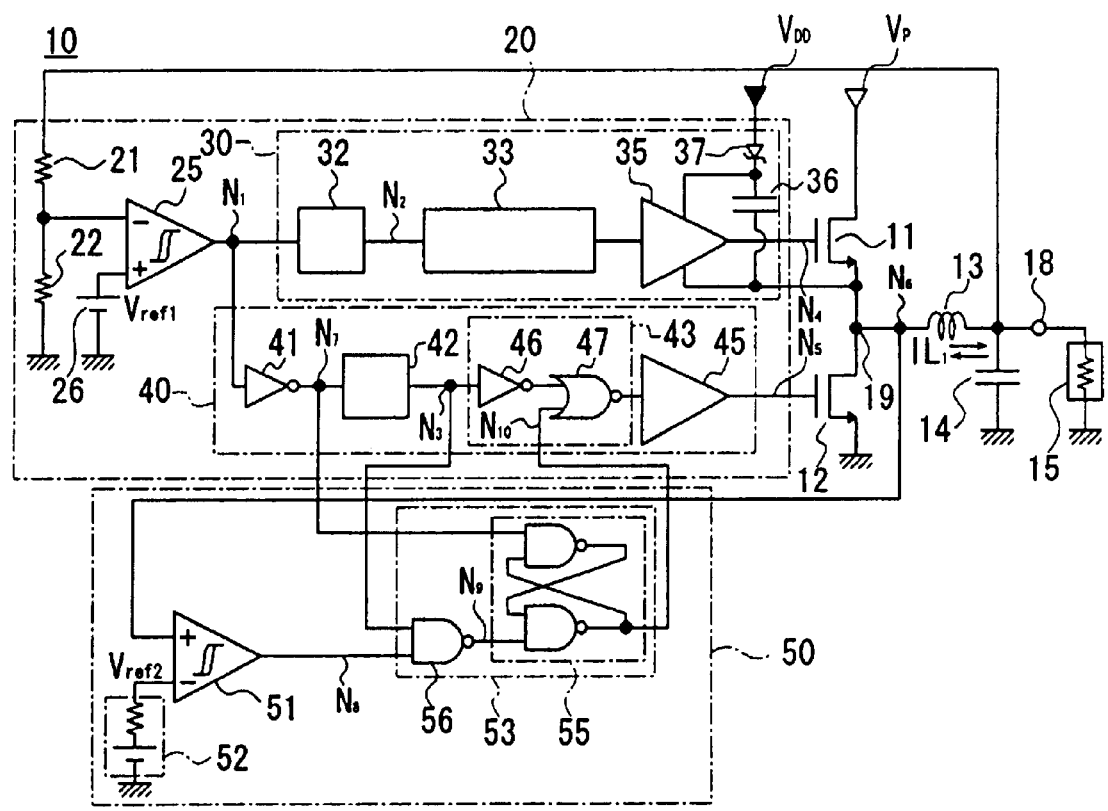
FIG. 1 is a switching power supply in the first example of the present invention.

Element 10 in FIG. 1 indicates a switching power supply, which is an example of the present invention.

This switching power supply 10 includes first and second output transistors 11 and 12, the inductance element 13, the output capacitor 14, the control circuit 20 and the frequency control unit 50.

First and second output transistors 11 and 12 include n-channel MOSFETs. The drain terminal of the first output transistor 11 is connected to the high voltage power supply $V_P$, while on the other hand; the source terminal of the second output transistor 12 is connected to the ground potential.

The source terminal of the first output transistor 11 is connected to the drain terminal of the second output transistor 12. Element 19 indicates the node between the first output transistor and the second output transistor 12.

To this node 19, one end of the inductance element 13 is connected. The other end of said inductance element 13 is connected to the output terminal 18.

Between the output terminal 18 and the ground potential, the output capacitor 14 is connected, and the load 15 is connected in parallel with the output capacitor 14 between the output terminal 18 and the ground potential.

The gate terminals of the first and the second output transistors 11 and 12 are connected to the control circuit 20, and the state of conduction and the state of cut-off are controlled by the control circuit 20.

In a state where the second output transistor 12 is cut off, if the first output transistor 11 conducts, one end of the inductance element 13 will be connected to the high voltage power supply $V_P$, and current will flow from the high voltage power supply $V_P$ to the inductance element 13. The current will charge the output capacitor 14 and be supplied to the load 15.

In the first and the second output transistors 11 and 12, parasitic diodes having the source diffusion layer as anode and the drain diffusion layer as cathode are generated.

Therefore, when the first output transistor 11 changes from conduction to cut-off, and a current in the direction of charging the output capacitor 14 is generated at both ends of the inductance element 13, the node 19 will have a negative potential, and the parasitic diode in the second output transistor 12 will have a forward bias. As a result, the parasitic diode will conduct, current supplied from the inductance element 13 will flow through the parasitic diode, and the current will be supplied to both the load 15 and the output capacitor 14.

Then, when a voltage at or higher than the threshold voltage is impressed to the gate terminal of the second output transistor 12 and the second output transistor 12 conducts, a current will flow from the source terminal of the second output transistor 12 to the drain terminal without passing through the parasitic diode inside.

When energy accumulated in the inductance element 13 has been consumed, current in the direction of charging the output capacitor 14 will stop. At that point, if the second output transistor 12 is in a conductive state, this time, by means of the discharge of the output capacitor 14 to the inductance element 13, a current will flow from the output terminal 18 toward the node 19. Further, current will flow from the drain terminal of the second output transistor 12 toward the source terminal.

In this state, in the inductance element 13, energy will be accumulated by means of the discharge current supplied from the output capacitor 14. Further, at this time, discharge current of the output capacitor 14 is also supplied to the load 15.

Then, when the second output transistor 12 is cut off, as a state wherein both the first and the second output transistors 11 and 12 are cut off will exist, and by means of energy accumulated in the inductance element 13, a voltage with polarity that allows current to flow in the same direction as the discharge current of the output capacitor 14 will be generated at the ends of the inductance element 13.

By the voltage, a voltage that is higher than the voltage of the high voltage power supply $V_P$ will be impressed to the source terminal of the first output transistor 11, and by the voltage that has been generated in the inductance element 13, a current will flow into the high voltage power supply $V_P$ through the parasitic diode in the first output transistor 11.

The current will stop when the energy accumulated in the inductance element 13 has been consumed.

The aforementioned conduction and cut-off of the first and the second output transistors 11 and 12 are controlled by the control circuit 20. To explain the internal configuration of the control circuit 20, said control circuit 20 includes first and second potential dividing resistors 21 and 22, a main reference voltage supply 26, a main comparator 25, and first and second gate driving circuits 30 and 40.

First and second potential dividing resistors 21 and 22 are connected in series, and the voltage that appears at the output terminal 18 is divided by the first and the second potential dividing resistors 21 and 22. The divided output voltage is input to the inverse input terminal of the main comparator 25.

The main reference voltage $V_{ref1}$ output by the main reference voltage supply 26 has already been input to the non-inverse input terminal of the main comparator 25, and when the divided voltage is higher than the main reference voltage $V_{ref1}$, the main comparator 25 outputs a low voltage LOW signal, and when it is the opposite, a high voltage HIGH signal.

The signals output from the main comparator 25 are respectively output to the first and the second gate driving circuits 30 and 40.

First, to explain the first gate driving circuit 30, this first gate driving circuit 30 includes the first delay circuit 32, a level shift circuit 33, the first buffer circuit 35, a diode 37 and an auxiliary power supply capacitor 36.

The signal output from the main comparator 25 is, in the first gate driving circuit 30, first input to the first delay circuit 32. In this first delay circuit 32, of the signals input, only the timing at which a LOW signal changes to a HIGH signal is delayed, and output to the level shift circuit 33.

The level shift circuit 33 shifts the voltage value of the input signal to the high voltage side, and outputs it to the first buffer circuit 35.

The power supply voltage terminal of the first buffer circuit 35 is connected to the cathode terminal of the diode 37, and the anode terminal of said diode 37 is connected to the low voltage power supply $V_{DD}$. The output voltage of this low voltage power supply $V_{DD}$ is lower than the output voltage of the high voltage power supply $V_P$.

Further, the ground potential side terminal of the first buffer circuit 35 is connected to the source terminal node 19 of the first output transistor 11.

Therefore, when the diode 37 is forward-biased, and current is supplied from the low voltage power supply $V_{DD}$, current will be supplied to the first buffer circuit 35, and flow into the source terminal of the first output transistor 11.

Further, between the power supply voltage terminal and the ground potential terminal of the first buffer circuit 35, the auxiliary power capacitor 36 is connected. Therefore, current that has run through the diode 37 will charge the auxiliary power supply capacitor 36.

When the voltage of the source terminal of the first output transistor 11 is sufficiently lower than the low voltage power supply $V_{DD}$, the diode 37 will have a forward bias; the first buffer circuit 35 will operate by means of the current that has run through the diode 37; and the auxiliary power supply capacitor 36 will be charged by the low voltage power supply $V_{DD}$.

On the other hand, in a state where the parasitic diode in the first output transistor 11 is forward-biased by an electromotive force generated in the inductance element 13, since the voltage of the source terminal of the first output transistor 11 is higher than the low voltage supply $V_{DD}$, the diode 37 will be inverse-biased, and the first buffer circuit 35 will have power supplied from the auxiliary power supply capacitor 36.

The first buffer circuit 35 will not invert the polarity of the input signal, and will output the noninverted signal to the gate terminal of the first output transistor 11 by reducing the output impedance.

First, a case will be explained wherein the signal output from the main comparator 25 is a LOW signal. In this case, from the first buffer circuit 35 to the gate terminal of the first output transistor 11, a LOW signal is input. That is, the gate terminal and the source terminal of the first output transistor 11 will be essentially connected.

Next, a case will be explained wherein a HIGH signal is output from the main comparator 25. In this case, irrespective of the magnitude of the potential of the source terminal of the first output transistor 11, the first buffer circuit 35 impresses a positive voltage at the threshold voltage level or higher between the gate terminal and the source terminal of the first output transistor 11 to make the first output transistor 11 conductive. As a result, the source terminal of the first output transistor 11 will be approximately the same potential as the high voltage power supply $V_P$.

As the output voltage of the low voltage power supply $V_{DD}$ is usually lower than the output voltage of the high voltage power supply $V_P$, when the first output transistor 11 conducts, the diode 37 will be inverse-biased. In this state, the power supply voltage terminal of the first buffer circuit 35 will be cut off from the low voltage power supply $V_{DD}$, and the first buffer circuit 35 will be driven by the charging voltage of the auxiliary power supply capacitor 36.

Now, in this state, the ground voltage terminal of the first buffer circuit 35 will have the same potential as the high voltage power supply $V_P$, and the power supply voltage terminal will be the potential obtained by adding the charging voltage of the auxiliary power supply capacitor 36 to the voltage of the high voltage power supply $V_P$.

Then, from this state, when the output signal of the main comparator 25 changes from a HIGH signal to a LOW signal, the first buffer circuit 35 will cut off the first output transistor 11 without delay.

Next, the operation of the second gate driving circuit 40 will be explained. Said second gate driving circuit 40 includes an inverter element 41, the second delay circuit 42, a main logic circuit 43 and the second buffer circuit 45.

The signal output from the main comparator 25 is first inverted by the inverter element 41, and output to the second delay circuit 42.

In this second delay circuit 42, only when the input signal changes from a LOW signal to a HIGH signal, is the change delayed and output.

The signal output from the second delay circuit 42 is transmitted to the second buffer circuit 45 through the main logic circuit 43.

To the main logic circuit 43, a control signal output from the frequency control unit 50 has been input, and the state of transmission of the signal input from the second delay circuit 42 is controlled by the control signal.

Here, if the signal output from the second delay circuit 42 has been directly transmitted to the second buffer circuit 45, the second buffer circuit 45, without inverting the polarity of the input signal, will reduce the output impedance and output it to the gate terminal of the second output transistor 12.

When a HIGH signal is output from the main comparator 25, the signal will be inverted by the inverter element 41, and when the signal is transmitted to the gate terminal of the second output transistor 12, the second output transistor 12 will be cut off.

In a state where the first output transistor 11 conducts and the second output transistor 12 is cut off, as mentioned above, to the inductance element 13, a current will be supplied from the high voltage power supply $V_P$, and the output capacitor 14 will be charged by the current. Further, current that has flowed in the inductance element 13 is supplied to the load 15 as well.

Next, from the state, when the output of the main comparator 25 switches from a HIGH signal to a LOW signal, the first output transistor 11 will immediately be cut off. On the other hand, the signal output from the inverter element 41 will be transmitted after being delayed by the second delay circuit 42. First, both the first output transistor 11 and the second output transistor 12 will be in a state of being cut off, and as mentioned above, a current will flow through the parasitic diode in the second output transistor 12.

Next, in a state where the first output transistor 11 is cut off, if a HIGH signal is transmitted to the gate terminal of the second output transistor 12, as mentioned above, the second output transistor 12 will conduct, and a current will flow from the source terminal toward the drain terminal of the second output transistor 12.

Figure 4:
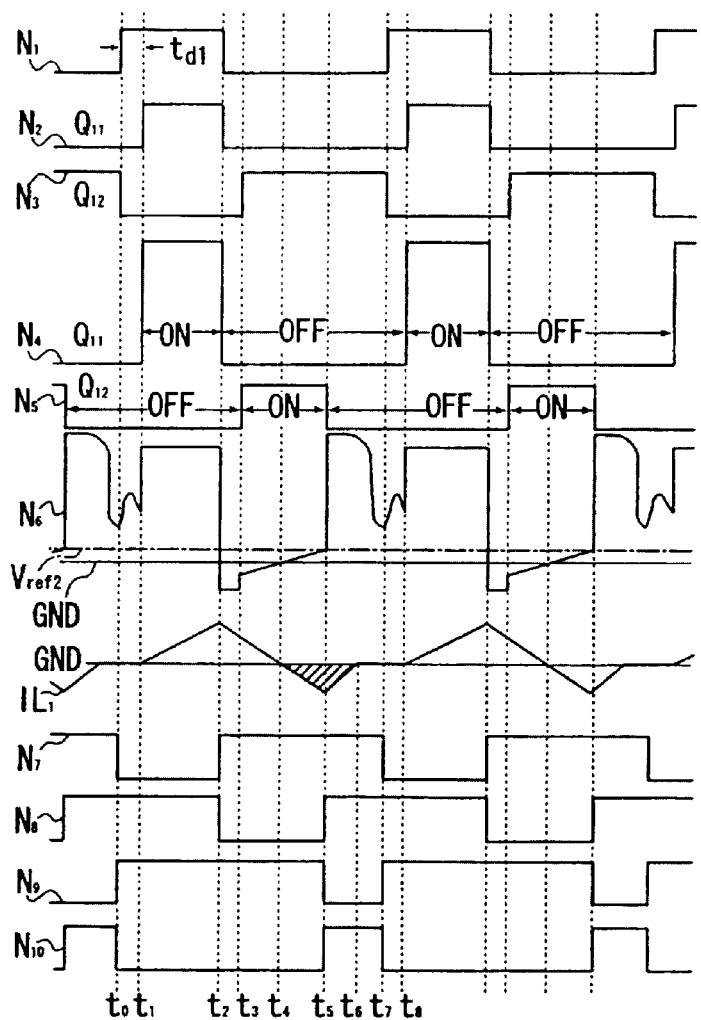
FIG. 4 is a timing chart to show the operation of a switching power supply of the present invention.

The graph in FIG. 4 is a timing chart, which illustrates the aforementioned operation of the switching power supply 10. The voltage waveforms indicated with Elements $N_1$–$N_{10}$ in this figure, respectively, indicate the output signal $N_1$ of the main comparator 25, the output signal $N_2$ of the first delay circuit 32, the output signal $N_3$ of the second delay circuit 42, the voltage $N_4$ of the gate terminal of the first output transistor 11, the voltage $N_5$ of the gate terminal of the second output transistor 12, the voltage $N_6$ of the node 19, the signal $N_7$, which is the output signal of the inverter element 41, and will be input to the reset terminal of the flip-flop 55 of the frequency control unit 50, which will be described later, the output $N_8$ of the auxiliary comparator 51, the signal $N_9$, which is input to the other set terminal of the flip-flop 55, and the output signal $N_{10}$ of the frequency control unit 50, which is the output signal of the flip-flop 55.

Further, Element $IL_1$ in this figure indicates the waveform of the current that flows to the inductance element 13. The current in the direction of charging the output capacitor 14 is indicated as positive polarity, and the current in the direction of discharging the output capacitor 14 is indicated as negative polarity.

In the graph in FIG. 4, the output signal of the main comparator 25 changes from LOW to HIGH at the time $t_0$, and after that, delay time $t_{d1}$ is provided in the first delay circuit 32, and the first output transistor 11 conducts when the time $t_1$ has been reached.

Immediately before reaching this time $t_1$, both the first and the second output transistors 11 and 12 are cut off, and as a result of conduction the first output transistor 11, a current $IL_1$ starts flowing to the inductance element 13 at the time $t_1$.

Then, from the time $t_1$ on, the current $IL_1$ increases, and at the time $t_2$, when the output signal of the main comparator 25 changes from HIGH to LOW, and the first output transistor 11 is cut off, the current $IL_1$ starts to decrease. At this time, at the gate terminals of the first and the second output transistors 11 and 12, a voltage with the same potential as their source terminals has been impressed, and they are in a cut-off state. When the first output transistor 11 is cut off at the time $t_2$, the voltage of the node 19 swings negative $N_6$, and by means of energy accumulated in the inductance element 13, a current in the direction of charging the output capacitor 14 will flow. The current will flow through the parasitic diode in the second output transistor 12.

Then, when a high voltage is impressed onto the gate terminal of the second output transistor 12 at the time $t_3$, the second output transistor 12 will conduct, and a current will flow from the source terminal toward the drain terminal. In this state, the voltage generated across second output transistor 12 decreases, and the potential of the node 19 nears the ground potential.

From this time $t_3$ on, the energy accumulated in the inductance element 13 will gradually decrease, and the magnitude of the current $IL_1$ will become smaller. When the energy accumulated in the inductance element 13 reaches zero at the time $t_4$, and the current $IL_1$ reaches zero, the potential of the node 19 will be equal to the ground potential.

At the time $t_4$, a high voltage has been impressed onto the gate terminal of the second output transistor 12, and it thus is in a conductive state. In this state, as the terminal on the high voltage side of the output capacitor 14 is connected to the ground potential by the second output transistor 12, from the time $t_4$ on, the output capacitor 14 discharges, and the output capacitor 14 supplies discharge current to the inductance element 13.

In this state, the direction of the current $IL_1$ flowing to the inductance element 13 is reversed from that between the time $t_2$–$t_4$. The discharge current of the output capacitor 14 will flow until the second output transistor 12 is cut off, and will increase gradually, thus, the potential of the output terminal 18 will gradually decrease, whereas the potential of the node 19 will gradually increase.

In the switching power supply in the prior art, the second output transistor 12 maintained a conductive state until the output signal of the main comparator 25 was inverted by the decrease of the voltage of the output terminal 18 and the first output transistor 11 changed to conduction. However, as explained below, the switching power supply 10 of the present invention is configured so that the second output transistor 12 will be cut off even with a light load and before the output signal of the main comparator 25 is inverted.

The frequency control unit 50 controls the second output transistor 12.

This frequency control unit 50 comprises an auxiliary comparator 51, an auxiliary reference voltage source 52, and an auxiliary logic circuit 53.

In the auxiliary comparator 51, both the auxiliary reference voltage $V_{ref2}$ output by the auxiliary reference voltage source 52 and the voltage of the node 19 are input. Here, the auxiliary reference voltage $V_{ref2}$ is a positive voltage $V_{ref2}$>GND. By controlling this positive voltage of the $V_{ref2}$, the lower-limit switching frequency can be controlled.

The auxiliary comparator 51 compares both voltages, and outputs the comparison result to the auxiliary logic circuit 53.

To the auxiliary logic circuit 53, the output signal of the inverter element 41, the output signal of the second delay circuit 42, and the output signal of the auxiliary comparator 51 are input. The output signal of the auxiliary logic circuit 53 is output to the main logic circuit 43.

To the main logic circuit 43, the output signal of the second delay circuit 42, and the output signal of the auxiliary logic circuit 53 are input, and as mentioned above, the state of transmission of the signal input from the second delay circuit 42 is controlled by the signal input from the auxiliary logic circuit 53.

From the second delay circuit 42, two types of signals including the signal HIGH signal for conduction of the second output transistor 12 and the signal LOW signal to cut it off are output. On the other hand, from the auxiliary logic circuit 53 to the main logic circuit 43, two types of signals including a transmission allowing signal and a forced cut-off signal are output.

The operation of the main logic circuit 43 changes as follows by means of the signal input from the auxiliary logic circuit 53.

When the transmission allowing signal is input from the auxiliary logic circuit 53, the main logic circuit 43 directly transmits the output signal of the second delay circuit 42 to the second buffer circuit 45.

On the other hand, when the forced cut-off signal is input, even if a signal to make the second output transistor 12 conductive has been input from the main logic circuit 43, a signal to cut off the second output transistor 12 is output to the second buffer circuit 45.

The auxiliary logic circuit 53, when the input signal and the output signal of the second delay circuit 42 have the polarity to make the second output transistor 12 conductive, and, when, in the auxiliary comparator 51, the potential of the node 19 surpasses the preset auxiliary reference voltage $V_{ref2}$, outputs a forced cut-off signal to the main logic circuit 53.

The auxiliary logic circuit 53 has been outputting a transmission allowing signal before a forced cut-off signal is output, and immediately before the forced cut-off signal is output, a signal to make the second output transistor 12 conductive is output from the second delay circuit 42. Therefore, the second output transistor 12 has been conductive.

In a state where a signal to make the second output transistor 12 conductive is output from the second delay circuit 42, if the auxiliary logic circuit 53 outputs a forced cut-off signal, the second output transistor 12 is forced to cut off.

Here, the first and the second output transistors 11 and 12 respectively conduct with a HIGH signal and cut off with a LOW signal. In the auxiliary comparator 51, at the time $t_5$ when the potential of the node 19 surpasses the auxiliary reference voltage $V_{ref2}$ output by the auxiliary reference voltage supply 52, the auxiliary circuit 53 outputs the forced cut-off signal.

Here, the forced cut-off signal is a HIGH signal. In this case, the main logic circuit 43 can include a circuit wherein the output terminal of the inverter element 46 is connected to one of the input terminals of the NOR element 47.

Also, the auxiliary logic circuit 53 can be comprised of a NAND element 56 to which the output signal of the auxiliary comparator 51 and the output signal of the second delay circuit 42 are input, and a flip-flop circuit to which the output signal of the NAND element 56 and the output signal of the inverter element 41 are input.

The output signal of the flip-flop circuit 55 is input to the other input terminal of the NOR element 47 of the main logic circuit 43.

In the timing chart of FIG. 4, at the time $t_5$, the potential of the node 19 surpasses the auxiliary reference voltage $V_{ref2}$, thus at this time $t_5$, the second output transistor 12 is cut off. As a result, the discharge current of the output capacitor 14 will gradually decrease to zero.

At this time, an electromotive force is generated in the inductance element 13, and the electromotive force forward-biases the parasitic diode in the first output transistor 11, and a current $IL_1$ will flow by means of the energy accumulated in the inductance element 13.

The direction in which the current $IL_1$ flows in the inductance element 13 is the same as the direction when discharge current of the output capacitor 14 flows. When the energy accumulated in the inductance element 13 has been consumed, the current $IL_1$ flowing in the inductance element 13 will stop. Here, the current $IL_1$ stops at the time $t_6$.

At the time $t_5$ and thereafter, across terminals of the first and the second output transistors 11 and 12, signals to cut off respective transistors 11 and 12 will be input.

After the time $t_6$ at which the current $IL_1$ stopped, because of the lowering of the voltage of the output terminal 18, at the time $t_7$, if the main comparator 25 outputs a HIGH signal, the first output transistor 11 will conduct with delay time $t_{d1}$ set in the first delay circuit 32.

Since the second output transistor 12 was already cut off at the time $t_5$ when the output signal of the auxiliary comparator 51 was inverted, the state of the second output transistor 12 will not be changed by the output signal of the main comparator 25.

With the switching power supply 10 of the present invention, in contrast to the switching power supply 510 in the prior art, during the period in which the first output transistor 11 is conductive, the discharge current of the output capacitor 14 flows between the time $t_4$–$t_5$.

Because the discharge current of this output capacitor 14 flows even if the load 15 is light, the lowering of oscillation frequency of the first and the second output transistors 11 and 12 in case of a light load is prevented. When the load 15 is heavy and the current that flows to the inductance element 13 has increased, the time $t_5$ at which the output signal of the auxiliary comparator 51 is inverted will be delayed and near the time $t_8$ at which the output signal of the main comparator 25 is inverted.

Then, when the load 15 is heavier and the output signal of the main comparator 25 is inverted before the output signal of the auxiliary comparator 51 is inverted, the frequency control unit 50 will be in a not-working state. Since the time $t_7$ at which the output signal of the main comparator 25 is inverted arrives sooner as the load becomes heavier, the oscillation frequency will be high.

Figure 5:
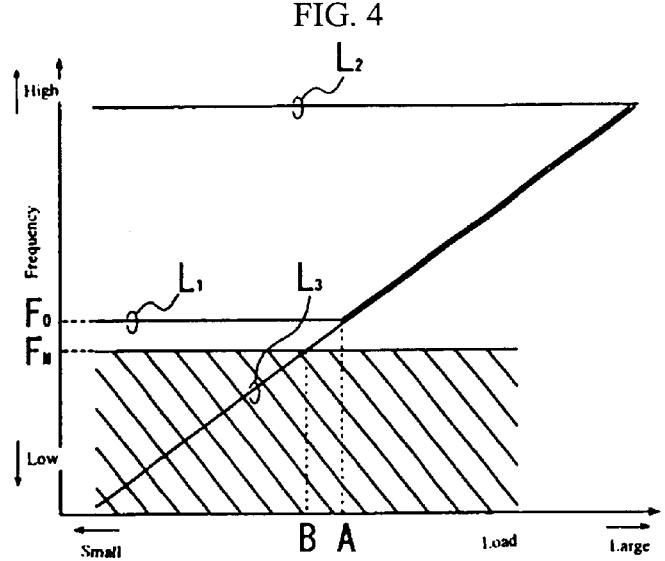
FIG. 5 is a graph to show the relationship between the load and the oscillation frequency of the switching power supply of the present invention and a switching power supply of the prior art.
Figure 6:
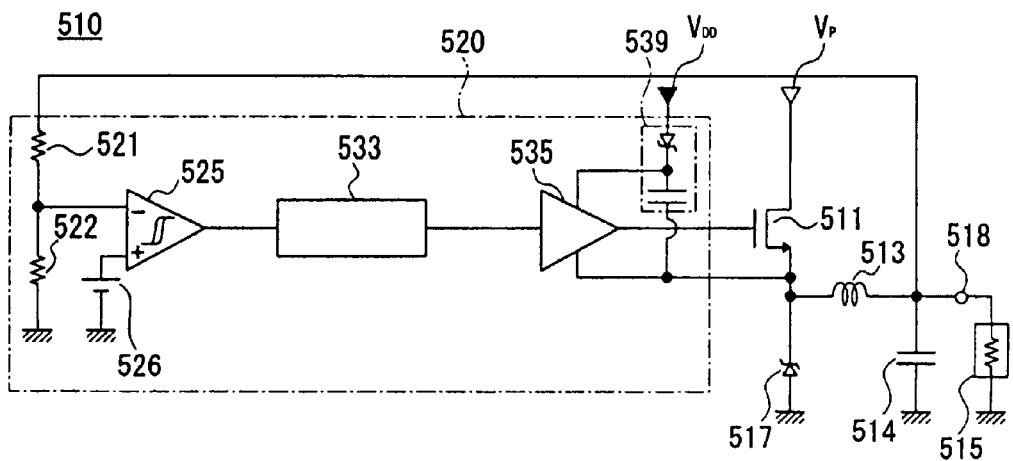
FIG. 6 is an example of a switching power supply in the prior art.
Figure 7:
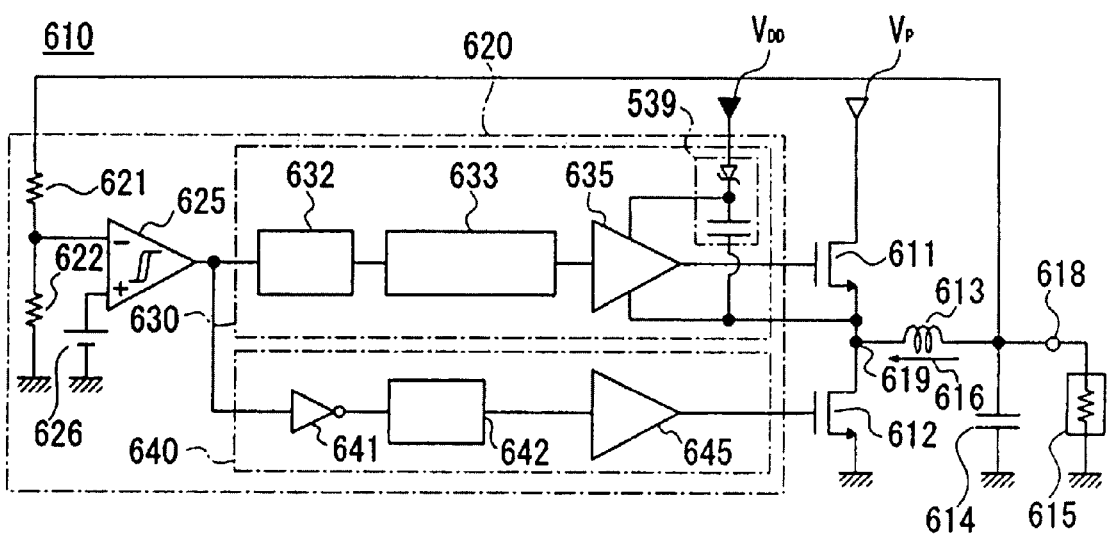
FIG. 7 is another example of a switching power supply in the prior art.

Element $L_1$ in the graph of FIG. 5 indicates a curve that illustrates the relationship between the load and the oscillation frequency of the switching power supply 10 of the present invention. The frequency is fixed until the magnitude of the load reaches A, and after it surpasses A, the frequency increases.

In this switching power supply 10, the oscillation frequency $F_0$ with a light load where the magnitude of the load is smaller than A is set higher than the upper limit frequency $F_M$ of the voice band $F_0 > F_M$. In the switching power supply 10 of the present invention; the oscillation frequency will never be lower than the oscillation frequency $F_0$ with a light load, so no audible noise will be generated.

Further, the oscillation frequency $F_0$ with a light load does not have to be an unnecessarily high frequency. The auxiliary reference voltage $V_{ref2}$ can be adjusted to obtain a frequency slightly higher than the upper limit frequency $F_M$. Thus, compared to a case where the oscillation frequency is set at a constant value, the lowering of efficiency when the load is light can be prevented.

Figure 2:
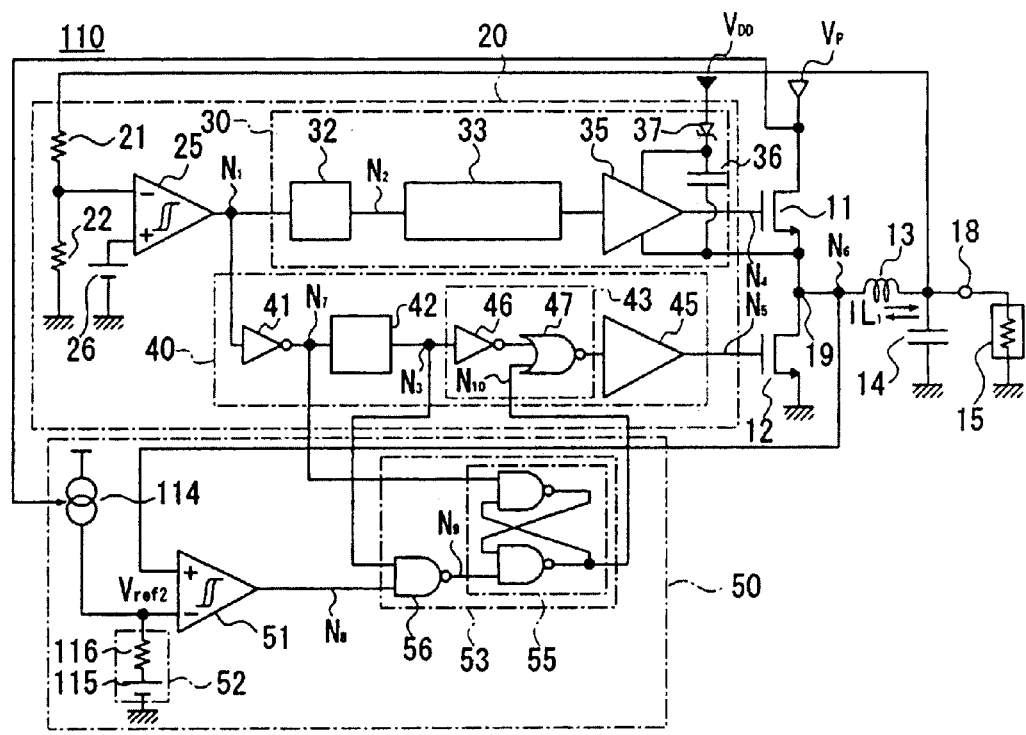
FIG. 2 is a switching power supply in the second example of the present invention.

Next, FIG. 2 illustrates the second application example of the present invention.

The switching power supply 110 in FIG. 2 adds a current supply 114 to the switching power supply 10 illustrated in FIG. 1.

This current supply 114 is connected so as to output a current to the auxiliary reference voltage supply 52, and the part at which the current supply 114 and the auxiliary reference voltage supply 52 are connected is connected to the inverse input terminal of the auxiliary comparator 51.

The auxiliary reference voltage supply 52 can be realized with an ideal circuit wherein a resistor 116 is connected in series to a constant voltage supply 115. As the current output by the current supply 114 flows through the resistor 116 and is absorbed by the low voltage supply 115, the voltage across resistor 116 changes depending on the magnitude of the current output by the current supply 114.

Because the auxiliary reference voltage $V_{ref2}$ output by the auxiliary reference voltage supply 52 is a voltage obtained by adding the voltage across resistor 116 to the output voltage of the constant voltage supply 115, when the output current of the current supply 114 changes, the auxiliary reference voltage auxiliary $V_{ref2}$ will also change.

The magnitude of the current which the current supply 114 supplies to the auxiliary reference voltage supply 52 is controlled by the high voltage power supply $V_P$, and will be in proportion to the magnitude of the voltage of the high voltage power supply $V_P$. Therefore, the magnitude of the current the current supply 114 supplies to the auxiliary reference voltage supply 52 will increase when the voltage of the high voltage power supply $V_P$ increases, and will decrease if it decreases.

In case of the switching power supply 10 in the first example of the present invention described above, when the voltage of the high voltage power supply $V_P$ increases, because of delay in the reaction of the main comparator 25, the first output transistor 11 will conduct unnecessarily long, and the output capacitor 14 will be over-charged. In addition, in that case, as the amount of discharge current of the output capacitor 14 by means of the second output transistor 12 does not change, after all, the oscillation frequency will be lowered.

With the switching power supply 110 in the second example, when the voltage of the high voltage power supply $V_P$ has increased, the auxiliary reference voltage $V_{ref2}$ the auxiliary reference voltage supply 52 outputs will increase, and the second output transistor 12 will conduct for a long time, and consequently, the discharge period between the time $t_4$ and the time $t_5$ in the graph of FIG. 4 of the output capacitor 14 will be longer, and as a result, over-charging of the main capacitor 14 due to reaction delay of the main comparator 25 will be canceled. Therefore, with the switching power supply 110 in the second example, even if the voltage of the high voltage power supply $V_P$ has increased, the oscillation frequency will not be lowered.

Figure 3:
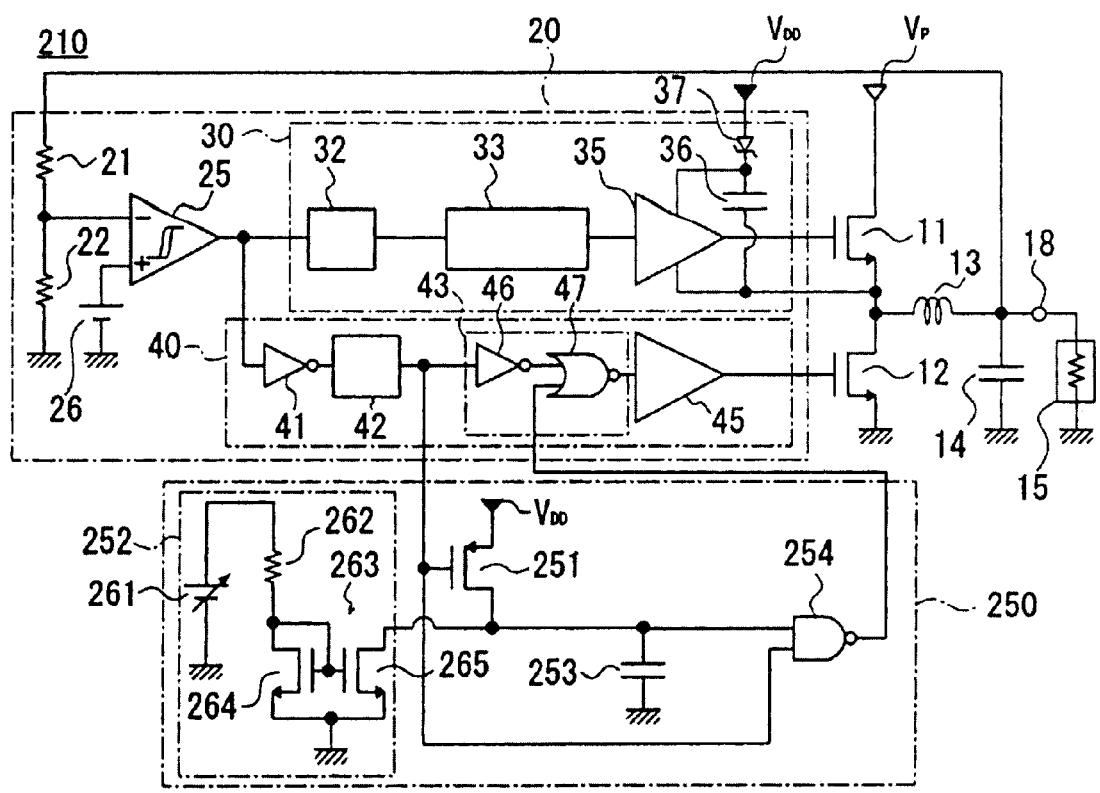
FIG. 3 is a switching power supply in the third example of the present invention.

Next, Element 210 in FIG. 3 illustrates the switching power supply in the third example of the present invention.

The frequency control unit 250 of this switching power supply 210 includes a constant current supply 252, a current supply transistor 251, a pulse time setting capacitor 253, and a NAND element 254.

The current supply transistor 251 is comprised of a p-channel MOSFET. The source terminal is connected to the low voltage power supply $V_{DD}$, and the gate terminal is connected to the output terminal of the second delay circuit 42. Further, the drain terminal is connected to the terminal on the high voltage side of the pulse time setting capacitor 253. The low voltage side terminal of the pulse time setting capacitor 253 is connected to the ground potential.

The output terminal of the constant current supply 252 is connected to the connection mid-point at which the high voltage side terminal of the pulse time setting capacitor 253 and the drain terminal of the current supply transistor 251 are connected. The constant current supply 252 is comprised so as to absorb constant current from its output terminal.

When the current supply transistor 251 is conductive, the pulse time setting capacitor 253 is charged with a current value obtained by subtracting the current absorbed by the constant current supply 252 from the current supplied from the current supply transistor 251.

On the other hand, when the current supply transistor 251 is cut off, the pulse time setting capacitor 253 is discharged with the constant current the constant current supply 252 absorbs.

Also, the output terminal of the second delay circuit 42 and the high voltage side terminal of the pulse time setting capacitor 253 are respectively connected to the input terminals of the NAND element 254, and only when both the voltage of the output signal of the second delay circuit 42 and the voltage of the high voltage side terminal of the pulse time setting capacitor 253 are in a HIGH state, is a LOW signal output from the output terminal of the NAND element 254.

To the NOR element 47 in the main logic circuit 43, the output signal of the inverter element 46 in the previous stage and the output signal of this NAND element 254 are input.

When the output of the second delay circuit 42 is a LOW signal, that is, in a state where a signal to cut off the second output transistor 12 is output from the second delay circuit 42, the current supply transistor 251 is in a conductive state, and the pulse time setting capacitor 253 is charged to the voltage of the low voltage power supply $V_{DD}$.

At this time, because both a LOW signal and a HIGH signal are input to the input terminals of the NAND element 254, the output is a HIGH signal; a LOW signal is output from the main logic circuit 43; and the second output transistor 12 is cut off.

From that state, when the output of the second delay circuit 42 turns from a LOW signal to a HIGH signal, both input terminals of the NAND element 254 will be a HIGH signal, and a LOW signal will be output to the main logic circuit 43.

This LOW signal transmits the HIGH signal input from the second delay circuit 42 to the second buffer circuit 45, and the second buffer circuit will make the second output transistor 12 conductive.

When the output of the second delay circuit 42 switches from a LOW signal to a HIGH signal, the current supply transistor 251 will be cut off, and the pulse time setting capacitor 253 will be discharged with a constant current.

Because of the discharge, the voltage of the pulse time setting capacitor 253 will be lowered, and the signal output from the pulse time setting capacitor 253 to the NAND element 254 will switch from a HIGH signal to a LOW signal after a certain time has passed.

By means of the switching the output signal of the NAND element 254 will switch from a LOW signal to a HIGH signal, and when the signal is input to the NOR element 47 in the main logic circuit 43, irrespective of the state of the output signal of the second delay circuit 42, the second output transistor 12 will be cut off.

Therefore, even in a case where, from the second delay circuit 42, a HIGH signal, that is, a signal to make the second output transistor 12 conductive is output, the second output transistor 12 can be conductive only during the time when the voltage of the pulse time setting capacitor 253 switches from a HIGH state to a LOW state, and after the switching, is forced to cut off.

The period while the second output transistor 12 can conduct is determined by the amount of current the constant current supply 252 absorbs.

This constant current supply 252 comprises a variable voltage supply 261, a current setting resistor 262 and two transistors 264 and 265.

Both transistors 264 and 265 are comprised of n-channel MOSFETs, and both source terminals are connected to the ground potential.

The drain terminal and the gate terminal of one transistor 264 is short-circuited, and diode-connected. The gate terminals of the two transistors are connected to each other, and a current mirror circuit 263 is constructed.

The low voltage side terminal of the variable voltage supply 261 is connected to the ground potential, and the high voltage terminal is connected to the gate terminal and the drain terminal of the diode-connected transistor 264 through the current setting resistor 262.

In this configuration, the magnitude of the current the constant current supply 252 absorbs will be the current that flows in the transistor 265, which is not diode-connected.

A current flows to the transistor 265 that is the same as that which flows to the diode-connected transistor 264.

Since a current with a magnitude that is determined by the characteristics of the transistor 264, the resistance value of the current setting resistor 262, and the output voltage of the variable voltage supply 261 flows to the diode-connected transistor 264, in the end, if the output voltage of the variable voltage supply 261 is adjusted, the magnitude of the current the constant current supply 252 absorbs can be controlled; thus, the period while the second output transistor 12 conducts can be adjusted by the output voltage of the variable voltage supply 261.

Thus, this switching power supply 210 can be applied to various products wherein the voltage ranges of the high voltage power supply $V_P$ are different.

With a light load, since the oscillation frequency of switching transistor is not lowered, the oscillation frequency does not need to be set at an unnecessarily high frequency, thus the efficiency of the switching power supply can be increased. Also, if the oscillation frequency is set to a frequency that is at or above the audible frequency with a light load, no noise will be generated.

What is claimed is:

1. A driving signal supply circuit supplying driving signals to the first and the second switching transistors of a switching regulator comprising the first switching transistor connected between a power supply voltage supply terminal and a first node; the second switching transistor connected between the first node and a reference voltage supply terminal, which can be in a conductive state when the first switching transistor is in a cut-off state; a coil with one end connected to the first node; and a smoothing capacitor connected between the other end of the coil and the reference voltage supply terminal, said driving signal supply circuit comprising:
a comparing circuit, which compares a first detected voltage corresponding to the output voltage of the switching regulator with a first reference voltage and outputs a first comparison signal;
a first driving circuit, which inputs the first comparison signal and outputs a first driving signal to drive the first switching transistor;
a second driving circuit, which inputs the first comparison signal and outputs a second driving signal to drive the second switching transistor;
a second comparing circuit, which compares a second detected voltage corresponding to the voltage of the first node with a second reference voltage and outputs a second comparison signal; and
a logic circuit, which inputs the second comparison signal and outputs an inhibiting signal to inhibit conduction of the second switching transistor.

2. A driving signal supply circuit in accordance with claim 1 wherein the second reference voltage changes corresponding to the power supply voltage.

3. A driving signal supply circuit in accordance with claim 1, wherein
the first driving circuit comprises a first delay circuit that provides a first delay time to the rise or the fall of the first comparison signal; and
the second driving circuit comprises a second delay circuit that provides a second delay time to the rise or the fall of the inverse signal of the first comparison signal, and a logic means that does a predetermined logical calculation of the output signal of the second delay circuit and the inhibiting signal and outputs a logic signal.

* * * * *